United States Patent
Kaminaga et al.

(10) Patent No.: US 9,100,598 B2
(45) Date of Patent: Aug. 4, 2015

(54) IMAGING APPARATUS AND IMAGE GENERATING METHOD

(75) Inventors: Shigeto Kaminaga, Tokyo (JP); Shinichiro Aizaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 627 days.

(21) Appl. No.: 12/908,270

(22) Filed: Oct. 20, 2010

(65) Prior Publication Data

US 2011/0102578 A1    May 5, 2011

(30) Foreign Application Priority Data

Oct. 29, 2009   (JP) ................................. 2009-248560

(51) Int. Cl.
| H04N 7/18 | (2006.01) |
| H04N 5/349 | (2011.01) |
| G02B 21/16 | (2006.01) |
| G02B 21/36 | (2006.01) |
| H04N 5/235 | (2006.01) |

(52) U.S. Cl.
CPC ................ H04N 5/349 (2013.01); G02B 21/16 (2013.01); G02B 21/365 (2013.01); H04N 5/235 (2013.01); H04N 5/2351 (2013.01); H04N 5/2355 (2013.01)

(58) Field of Classification Search
CPC ...... G01B 11/022; G01B 11/024; H04N 7/18; H04N 7/181; G01C 15/00
USPC ................ 348/135, 222.1; 382/275; 600/476
IPC ........................................................ H04N 7/18
See application file for complete search history.

(56) References Cited

U.S. PATENT DOCUMENTS

| 6,674,444 | B1 * | 1/2004 | Tahara ........................ 345/589 |
| 2003/0016301 | A1 * | 1/2003 | Aizaki et al. .................. 348/345 |
| 2004/0119841 | A1 * | 6/2004 | Shimizu ..................... 348/222.1 |
| 2008/0015446 | A1 * | 1/2008 | Mahmood et al. ............. 600/476 |
| 2008/0151367 | A1 * | 6/2008 | Aizaki et al. .................. 359/389 |
| 2009/0136152 | A1 * | 5/2009 | Kameyama ................... 382/275 |
| 2009/0141127 | A1 * | 6/2009 | Aizaki ............................ 348/79 |
| 2011/0102578 | A1 * | 5/2011 | Kaminaga et al. ............ 348/135 |

FOREIGN PATENT DOCUMENTS

JP    08-251604    9/1996

* cited by examiner

*Primary Examiner* — Thao X Le
*Assistant Examiner* — Long Le
(74) *Attorney, Agent, or Firm* — Scully, Scott, Murphy & Presser, P.C.

(57) ABSTRACT

An imaging apparatus includes: an imaging unit for capturing an image of a fluorescent sample; a pixel shift unit for changing the relative position of the imaging unit for the image; an image correction unit for correcting the gray-scale levels of plural pieces of image data using the histograms of the image data acquired by the imaging unit at different relative positions; and an image combination unit for combining the plural pieces of image data corrected by the image correction unit.

15 Claims, 18 Drawing Sheets

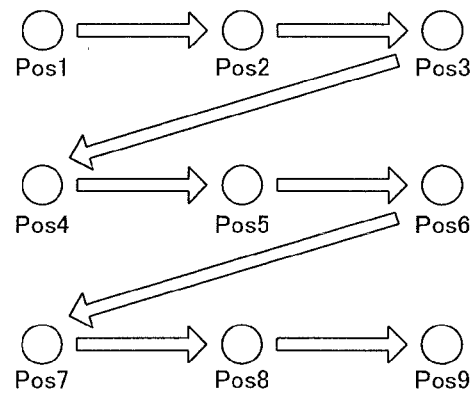
FIG. 5A
PRIOR ART
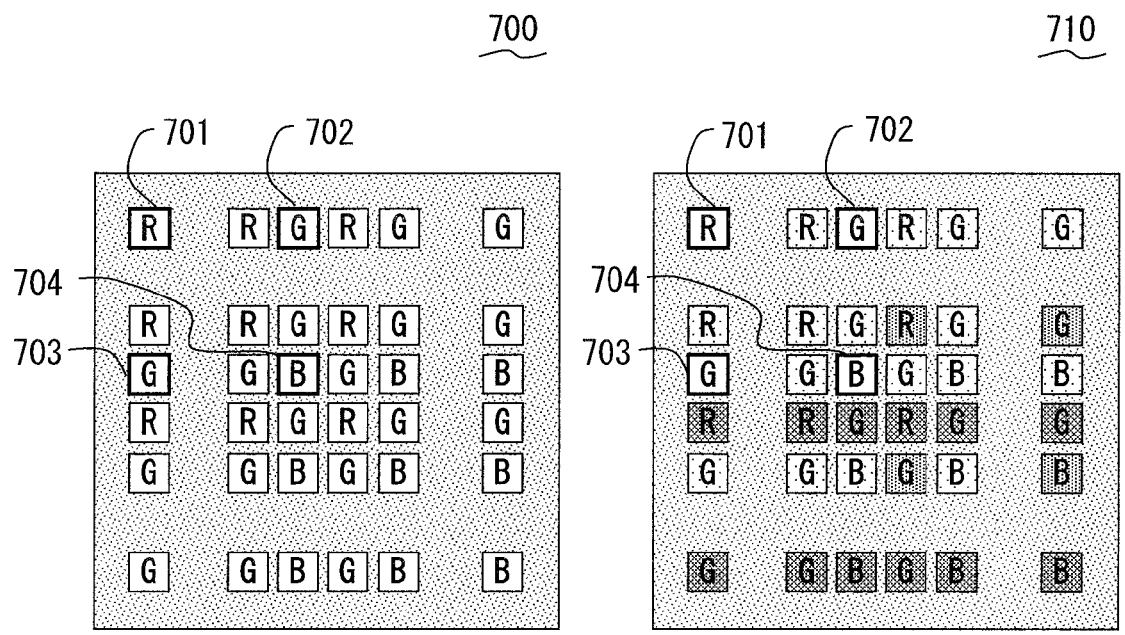
FIG. 5B
PRIOR ART
FIG. 5C
PRIOR ART

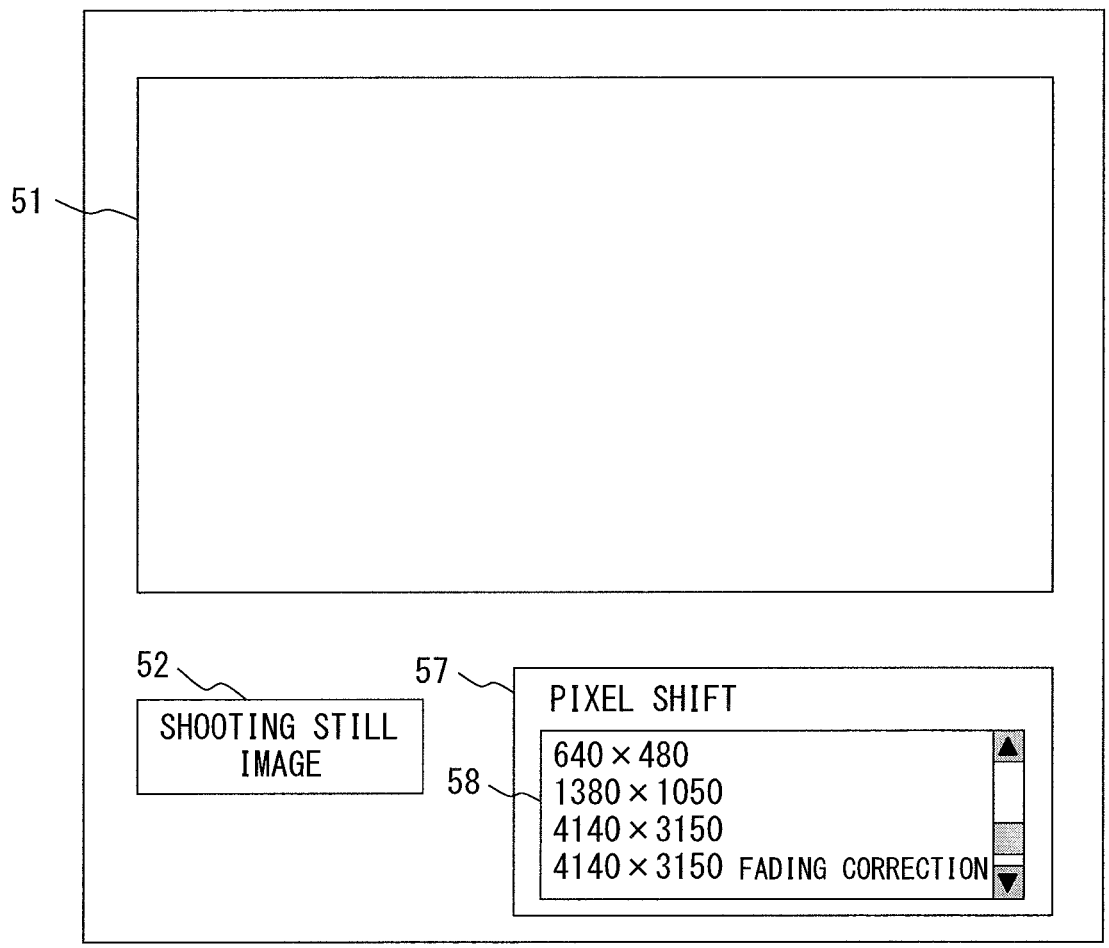
F I G. 9

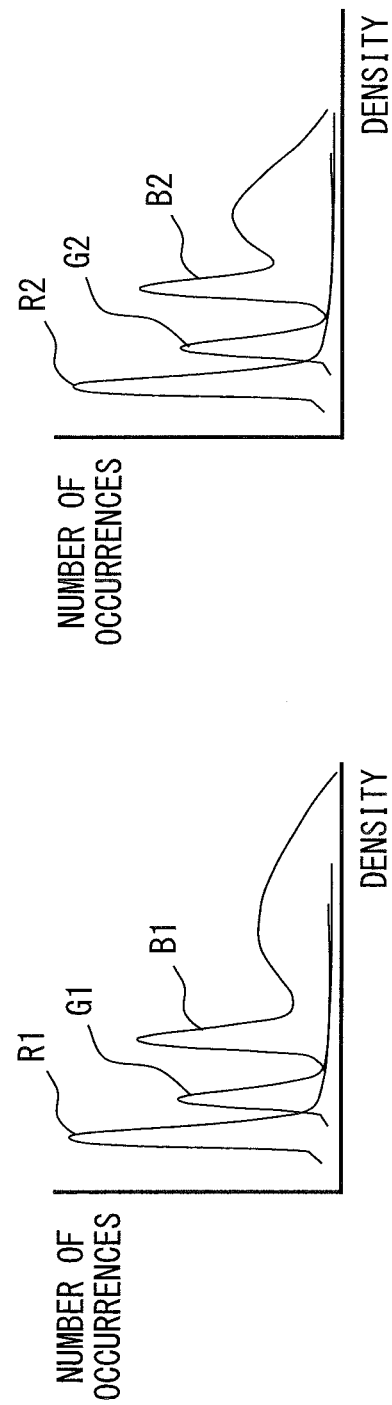

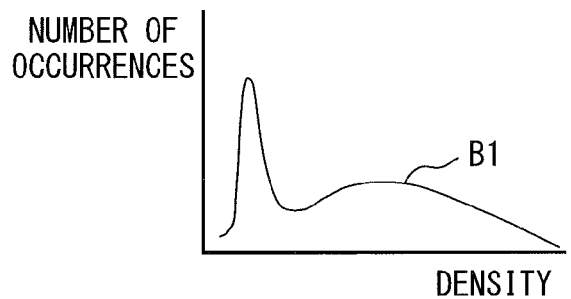
F I G. 1 2 A
F I G. 1 2 B
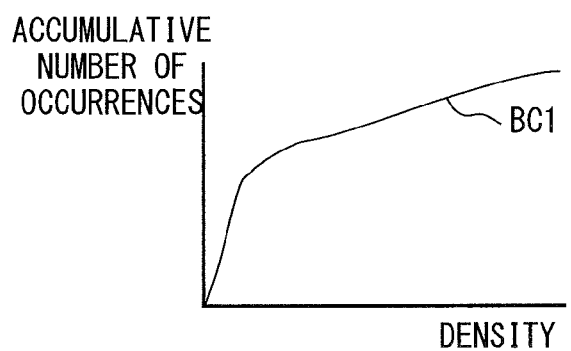
F I G. 1 2 C
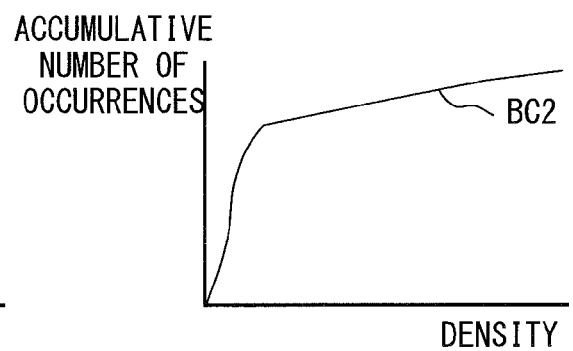
F I G. 1 2 D
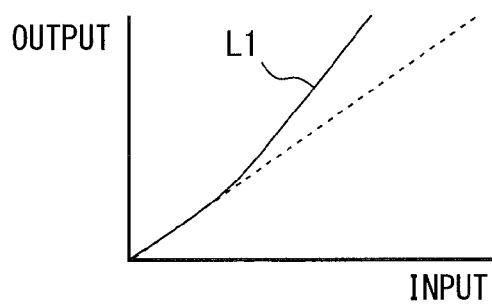
F I G. 1 2 E

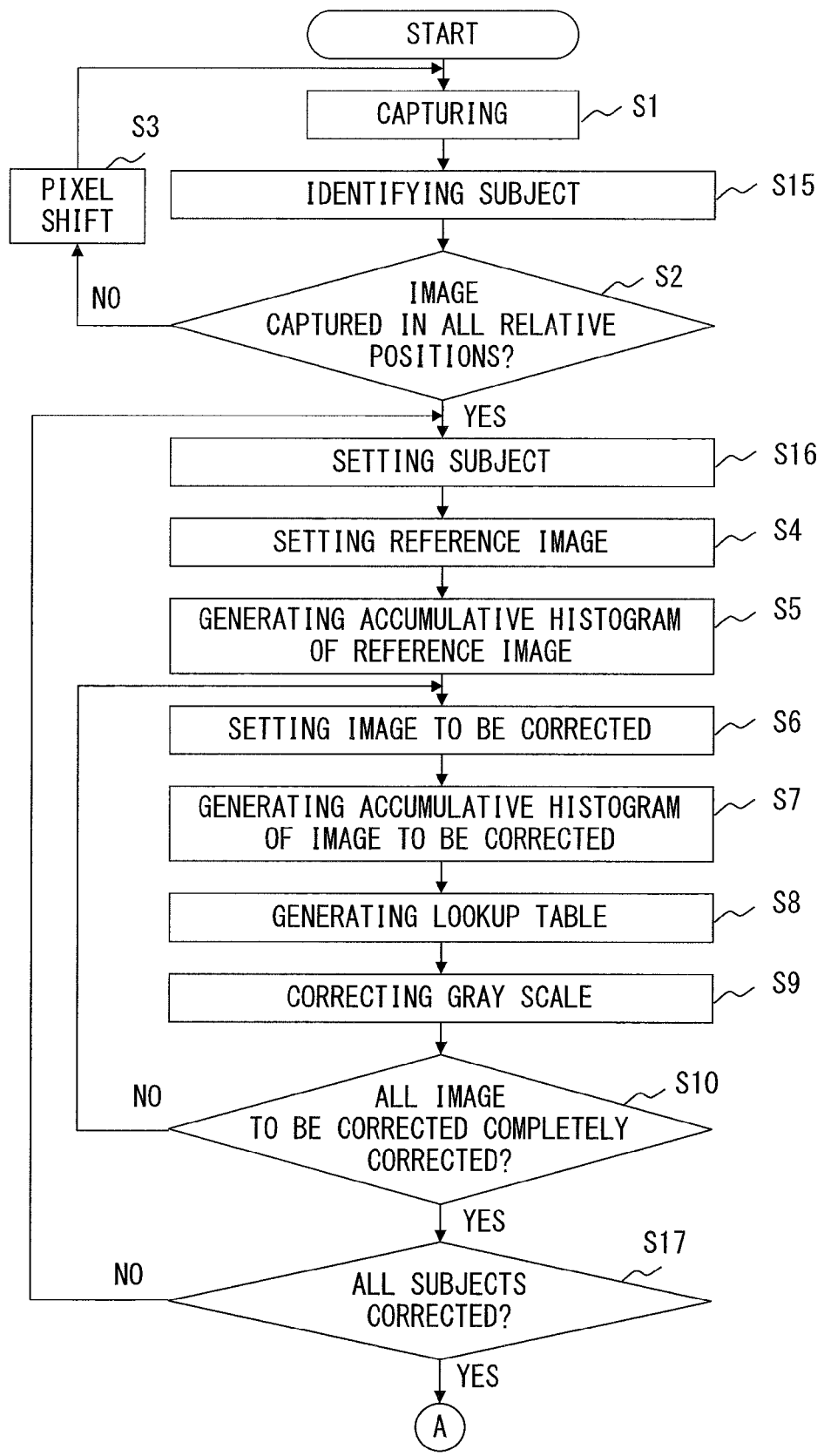
F I G. 1 3 A

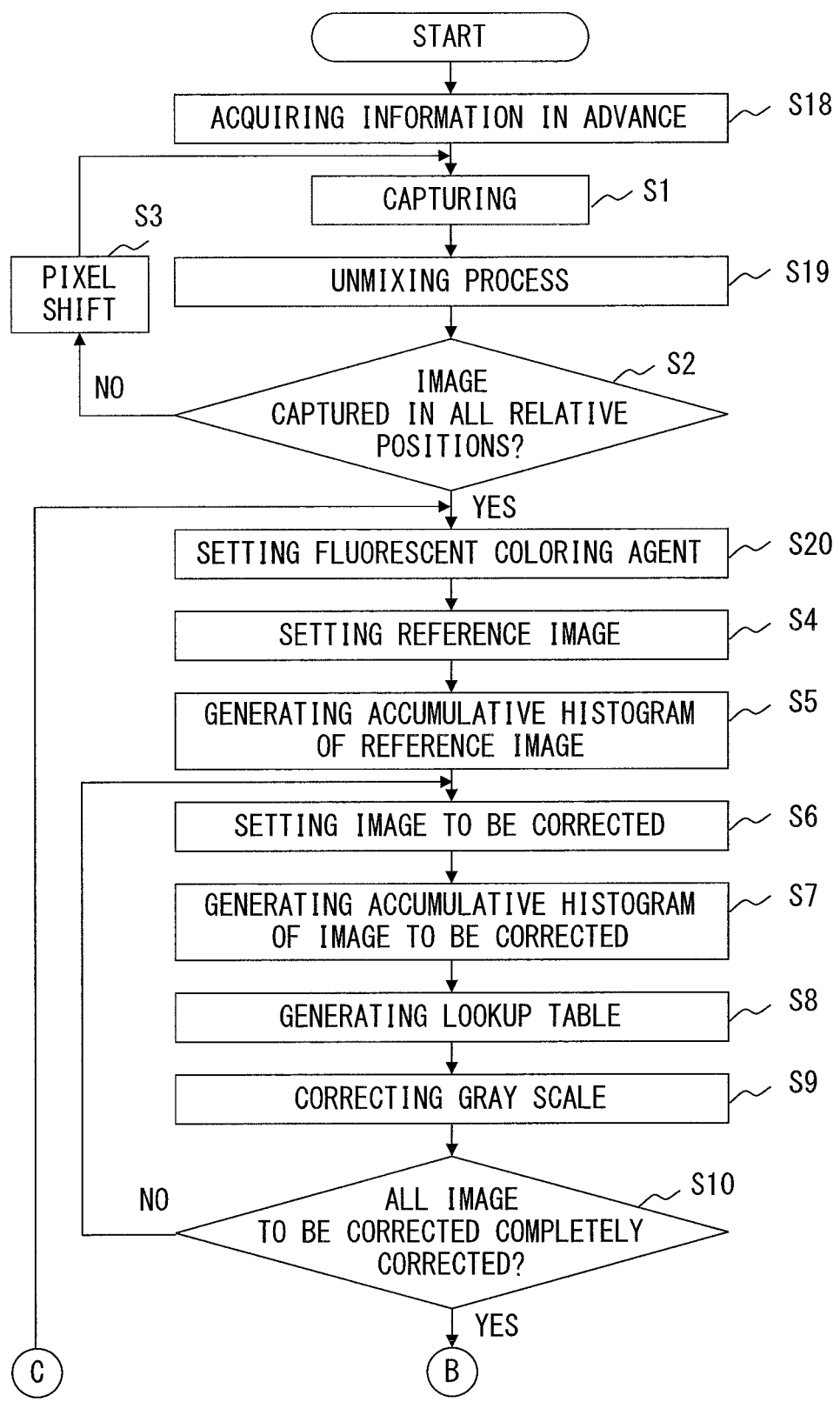
F I G. 1 5 A

IMAGING APPARATUS AND IMAGE GENERATING METHOD

CROSS REFERENCE TO RELATED APPLICATIONS

This application is based upon and claims the benefit of priority from the prior Japanese Patent Laid-Open No. 2009-248560, filed Oct. 29, 2009, the entire contents of which are incorporated herein by this reference.

BACKGROUND OF THE INVENTION

1. Field of the Invention

The present invention relates to the technology of an imaging apparatus and an image generating method, and more specifically to the technology of an imaging apparatus and an image generating method for a fluorescent sample.

2. Description of the Related Art

There is an imaging apparatus well known for converting the light from a sample into an electric signal, and generating an image of the sample.

The imaging apparatus has an imaging unit having a solid-state image pickup device for performing an optoelectric conversion. The imaging unit normally has a plurality of pixel units capable of independently detecting the quantity of light. When an image is generated using the imaging unit with the configuration above, the resolution of the image is limited by not only the resolution of an optical system (hereinafter referred to as an optical resolution) between the sample and the imaging unit, but also the number of pixel units (hereinafter referred to as the number of pixels) included in the imaging unit.

Accordingly, although the optical resolution of an optical system is sufficiently high, the imaging unit limits the resolution of the image if the number of pixels is small and the resolution which can be realized is low, thereby failing in acquiring an image of a satisfactory resolution.

For example, FIG. 1 exemplifies an imaging apparatus having a microscope between the sample and the imaging unit. In an imaging apparatus 400 exemplified in FIG. 1, an imaging apparatus body 200 such as a digital camera for a microscope is connected to a port 101 of a microscope 100, and the imaging apparatus body 200 captures a sample image output from the port 101.

For more details, the light emitted from the light source 102 provided for the microscope 100 is converted into parallel light through a collector lens 103, reflected by a mirror 104, and irradiated to a sample 109 through a windows lens 105, field stop 106, aperture stop 107 and a condenser lens 108. The light passing through the sample 109 is output as a sample image from the port 101 through an objective 110 and a tube lens 111.

The imaging apparatus body 200 is provided with an image pickup device 201 such as a CCD functioning as an imaging unit for capturing a sample optical image output from the port 101 of the microscope 100. The image pickup device 201 is driven at an exposing time according to a drive signal from an image pickup device drive unit 202, and inputs an output signal to a preprocessing unit 203. The preprocessing unit 203 converts the output signal of the image pickup device 201 into a video signal according to a control pulse provided from the image pickup device drive unit 202, and inputs the resultant signal to an A/D conversion unit 204. The A/D conversion unit 204 outputs the video signal as digital image data to a signal processing unit 205 according to the clock signal from the image pickup device drive unit 202. Afterwards, the image data is processed for a signal by the signal processing unit 205 performing a color correction, a gray-scale correction, etc., converted into an analog signal by a D/A conversion unit 206, and displayed as moving pictures on a display unit 207.

In addition, a control unit 209 which has received an instruction from an operation unit connected to an I/F unit 208 transmits the image data from the signal processing unit 205 to a record unit 211 through a bus 210, and records the data as a still image.

FIG. 2 exemplifies an imaging apparatus having a microscope similar to that illustrated in FIG. 1 between the sample and the imaging unit. A imaging apparatus 401 exemplified in FIG. 2 includes a personal computer (PC) 300 in addition to the microscope 100 and the imaging apparatus body 200. In the imaging apparatus 401, the D/A conversion unit 206, the display unit 207, and the record unit 211 are deleted, and are replaced with the PC 300 connected to an I/F unit 212 and having the functions of the deleted units. Apart of image processing can also be performed by the PC 300.

In the imaging apparatuses 400 and 401 exemplified respectively in FIGS. 1 and 2, when the number of pixels of the image pickup device 201 is small, the optical properties of the microscope 100 cannot fully work although the optical resolution of the microscope 100 is sufficiently high, thereby failing in obtaining an image of a satisfactory resolution.

To solve the above-mentioned problem, there is a countermeasure for improving the resolution by increasing the number of pixels of the image pickup device 201 (imaging unit). However, in this case, it is pointed out that there occurs a new problem with the imaging unit about a production cost, an optoelectric conversion efficiency, etc.

On the other hand, there is a pixel shifting technique proposed as technology for improving the resolution of an image generated by an imaging apparatus without increasing the number of pixels of the imaging unit. The pixel shifting technique improves the resolution of an image up to or exceeding the resolution of the imaging unit by combining a plurality of images having different relative positions of the imaging unit for a sample optical image by image processing. It is disclosed by, for example, Japanese Laid-open Patent Publication No. 8-251604 etc.

FIG. 3 exemplifies the configuration of the imaging apparatus using the pixel shifting technique. An imaging apparatus 402 exemplified in FIG. 3 is different from the imaging apparatus 401 exemplified in FIG. 2 in that the imaging apparatus 402 has a device shift unit 213 (pixel shift unit) for moving the image pickup device 201. The imaging apparatus 402 acquires images at different relative positions by changing the relative position of the image pickup device 201 for a sample image using the device shift unit 213. Then, by combining the acquired images, an image having a resolution equal to or exceeding the resolution of the image pickup device 201 can be generated.

For example, as exemplified in FIG. 4A, if the imaging apparatus by the pixel shifting technique captures an optical image of a fluorescent sample 500 having a cell area 601 including areas 602 and 603 dyed by the respective fluorescent coloring agents and a background area 604 including no fluorescent coloring agent, then an image 510 exemplified in FIG. 4B is generated.

Described below with reference to FIGS. 5A through 5C and 6A through 6I is the reason for an occurrence of a checkered pattern as exemplified in FIG. 4B in the fluorescent image generated by the imaging apparatus.

The imaging apparatus by the pixel shifting technique acquires a plurality of images having different relative positions of the imaging unit for a sample optical image.

Practically, for example, the imaging unit is configured so that the pixel unit of red (R) can be arranged at an initial pixel position 701, the pixel unit of green (G) can be arranged at initial pixel positions 702 and 703, and the pixel unit of blue (B) can be arranged at an initial pixel position 704 as exemplified in FIG. 5B in the state in which the imaging unit is at a first relative position Pos 1 exemplified in FIG. 5A. In addition, the relative position of the imaging unit is sequentially changed from the first relative position Pos 1 to a ninth relative position Pos 9 so that the pixel shift unit can make a shift by ⅔ pixel pitch for each relative position. Then, an image of the sample 500 is acquired at each relative position. Thus, a bayer pattern 700 exemplified in FIG. 5B is generated.

An image 501 exemplified in FIG. 6A through an image 509 exemplified in FIG. 6I are exemplified as an image of the sample 500 acquired when the imaging unit is positioned respectively at the first relative position Pos 1 through the ninth relative position Pos 9.

As exemplified in FIGS. 6A through 6I, with the images (images 501 through 509) of the sample 500, the brightness of the cell area 601 decreases with the progress of the acquisition of images, thereby obtaining a darker image. Since there occurs a time difference between the acquisition times of images, time passes as images are acquired, and the fluorescent coloring agent for dyeing the cell area 601 fades, thereby decreasing the fluorescence generated by a fluorescent coloring agent. Therefore, as with a bayer pattern 710 exemplified in FIG. 5C, the quantity of light entering each adjacent pixel unit aiming at the same portion of the cell area 601 are also different depending on the acquisition time by the influence of the fading. In FIG. 5C, the quantity of light entering each pixel unit is expressed by a gray-scale level of each pixel unit.

Thus, when the imaging apparatus by the pixel shifting technique is used in a fluorescence observation, acquired are a plurality of images having different brightness levels depending on the fading of the fluorescent coloring agent. Since an image is generated by combining the images at different brightness levels, a checkered pattern occurs on the generated image.

As exemplified in FIG. 4B, the checkered pattern occurs in the cell area 601 dyed by a fluorescent coloring agent. Therefore, to remove the checkered pattern, there is a method proposed to adjust the exposing time for each of the images different in relative position by considering the fading of the fluorescent coloring agent. In this method, the brightness of the background area 604 is different for each image, and the checkered pattern occurs in the background area 604 unlike the case illustrated in FIG. 4B.

SUMMARY OF THE INVENTION

An aspect of the present invention provides an imaging apparatus including: an imaging unit for capturing an image of a fluorescent sample; a pixel shift unit for changing the relative position of the imaging unit for the image; an image correction unit for correcting the gray-scale levels of plural pieces of image data using the histograms of the image data acquired by the imaging unit at different relative positions; and an image combination unit for combining the plural pieces of image data corrected by the image correction unit.

Another aspect of the present invention provides an image generating method including: changing the relative position of an imaging unit for an image of a fluorescent sample, capturing the image of the fluorescent sample at a plurality of different relative positions, and acquiring image data; generating a histogram for each relative position from the image data acquired for each relative position; correcting the gray-scale level of the image data using the histogram; and combining the image data whose gray-scale levels have been corrected.

BRIEF DESCRIPTION OF THE DRAWINGS

The present invention will be more apparent from the following detailed description when the accompanying drawings are referenced.

FIG. 5A is an explanatory view of the relative position of the imaging unit included in the imaging apparatus by the pixel shifting technique according to a prior art;

FIG. 5B is an explanatory view of a bayer pattern of the imaging unit included in the imaging apparatus by the pixel shifting technique according to a prior art;

FIG. 5C is an explanatory view of a bayer pattern of the imaging unit included in the imaging apparatus by the pixel shifting technique according to a prior art;

FIG. 9 exemplifies another GUI screen of the program for generating a still image used in the imaging apparatus according to the embodiment 1;

FIG. 11A is an explanatory view of the histogram of the reference image and the image to be corrected acquired by the imaging apparatus according to the embodiment 1;

FIG. 11B is an explanatory view of the histogram of the reference image and the image to be corrected acquired by the imaging apparatus according to the embodiment 1;

FIG. 12A is an explanatory view of a method of generating a lookup table from the reference image and the image to be corrected acquired by the imaging apparatus according to the embodiment 1;

FIG. 12B is an explanatory view of a method of generating a lookup table from the reference image and the image to be corrected acquired by the imaging apparatus according to the embodiment 1;

FIG. 12C is an explanatory view of a method of generating a lookup table from the reference image and the image to be corrected acquired by the imaging apparatus according to the embodiment 1;

FIG. 12D is an explanatory view of a method of generating a lookup table from the reference image and the image to be corrected acquired by the imaging apparatus according to the embodiment 1;

FIG. 12E is an explanatory view of a method of generating a lookup table from the reference image and the image to be corrected acquired by the imaging apparatus according to the embodiment 1;

FIG. 13A is a flowchart of the image generating process including the fading correcting process used in the imaging apparatus according to the embodiment 2;

FIG. 15A is a flowchart of the image generating process including the fading correcting process used in the imaging apparatus according to the embodiment 3;

DESCRIPTION OF THE PREFERRED EMBODIMENTS

Each embodiment of the present invention is described below with reference to the attached drawings.

<Embodiment 1>

Figure 1:
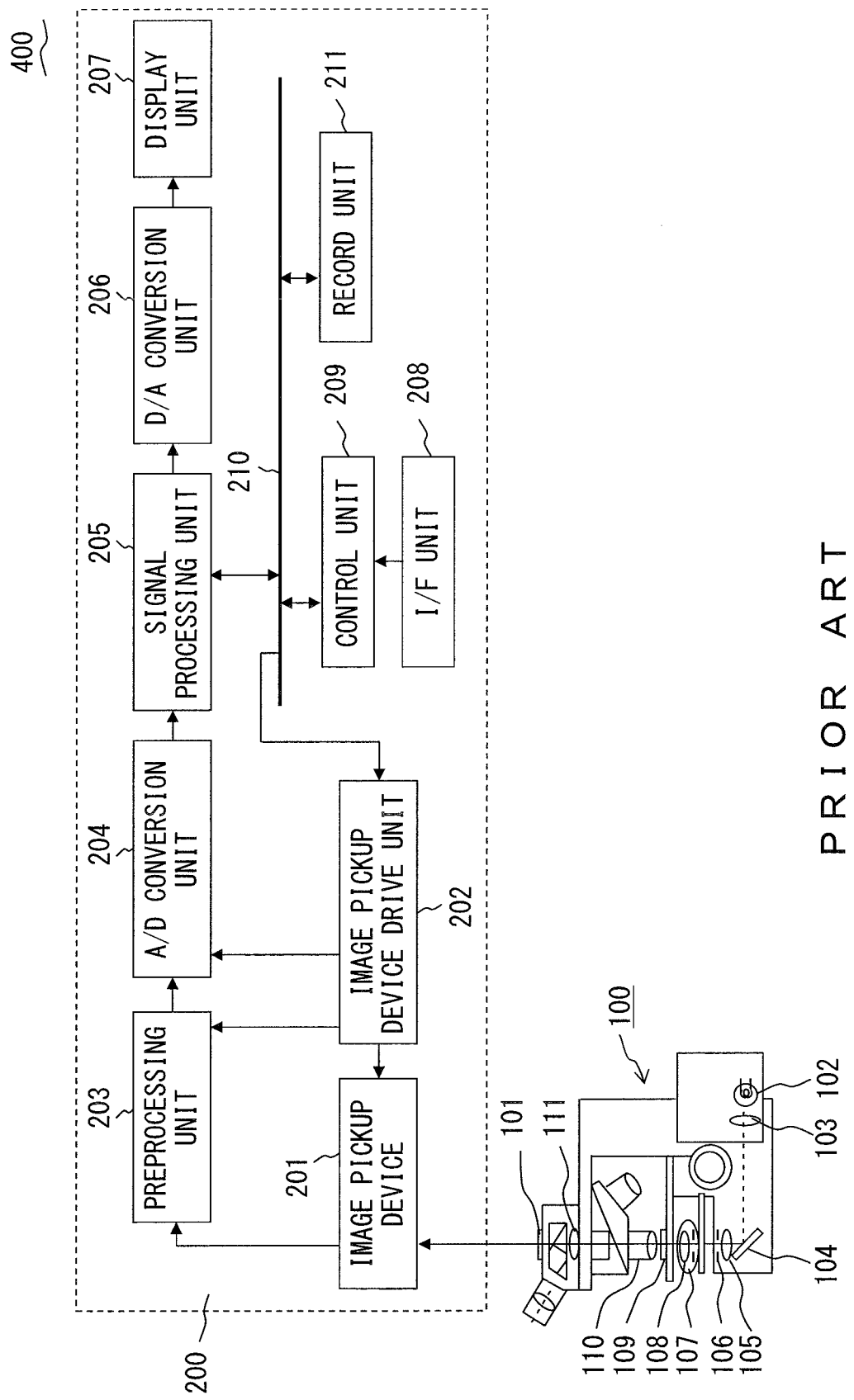
FIG. 1 exemplifies a configuration of the imaging apparatus according to a prior art.
Figure 2:
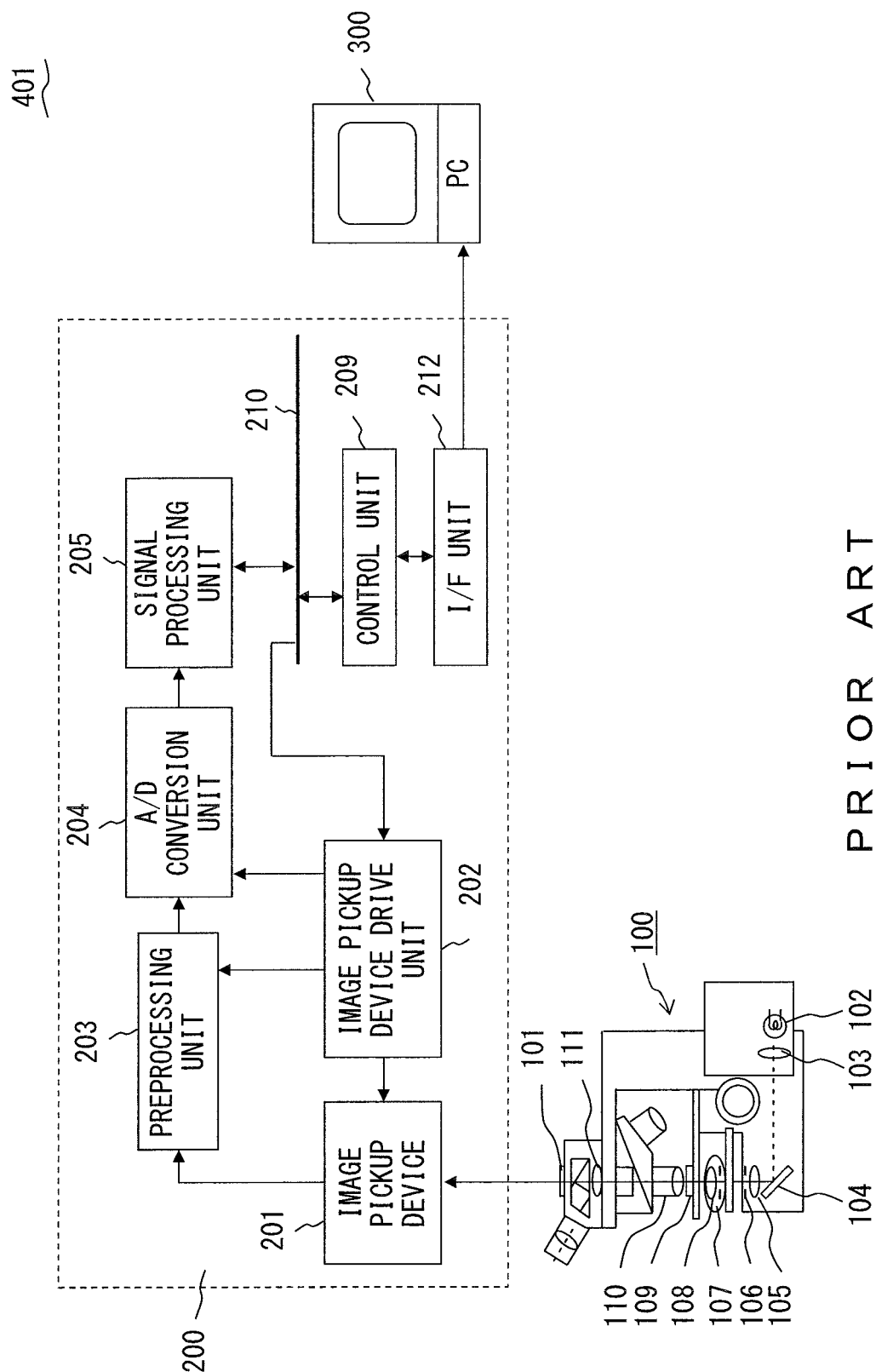
FIG. 2 exemplifies another configuration of the imaging apparatus according to a prior art.
Figure 3:
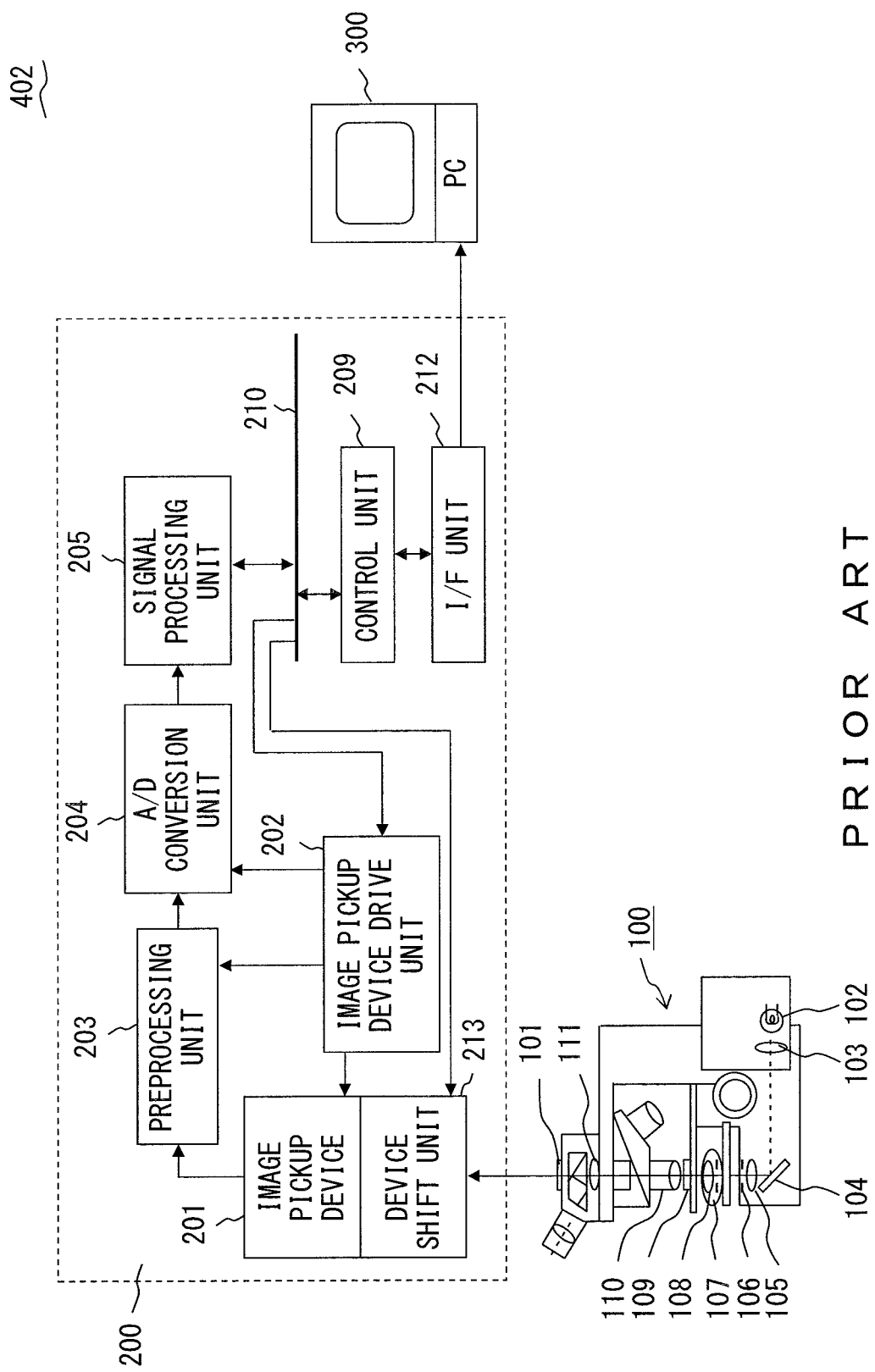
FIG. 3 exemplifies a configuration of the imaging apparatus by the pixel shifting technique according to a prior art.
Figures 4A, 4B:
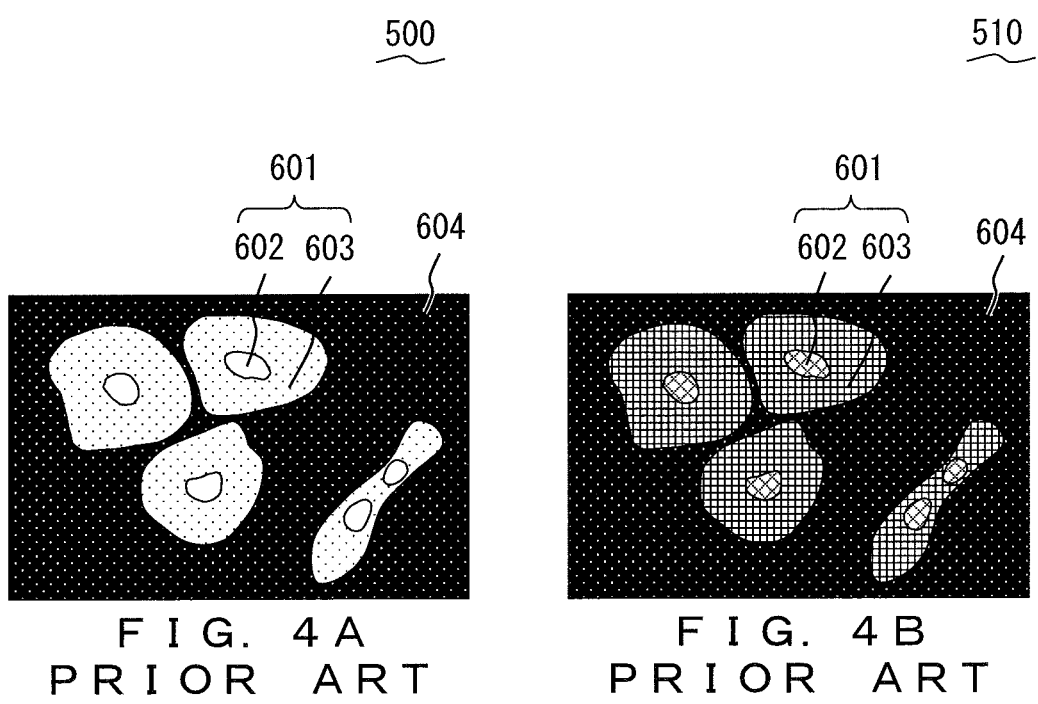
FIG. 4A is an explanatory view of a fluorescent image generated by the imaging apparatus by the pixel shifting technique according to a prior art.
FIG. 4B is an explanatory view of a fluorescent image generated by the imaging apparatus by the pixel shifting technique according to a prior art.
Figures 6A, 6B, 6C:
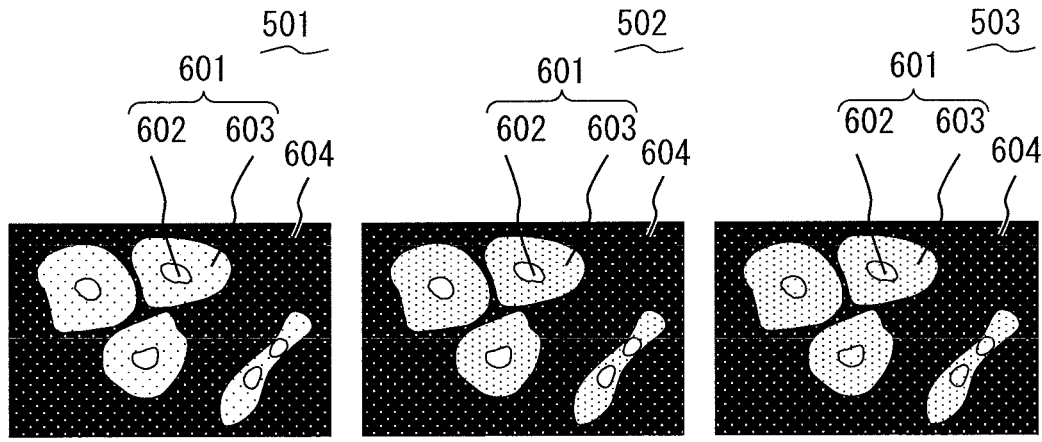
FIG. 6A exemplifies a fluorescent image acquired at a relative position exemplified in FIG. 5A.
FIG. 6B exemplifies a fluorescent image acquired at a relative position exemplified in FIG. 5A.
FIG. 6C exemplifies a fluorescent image acquired at a relative position exemplified in FIG. 5A.
Figures 6D, 6E, 6F:
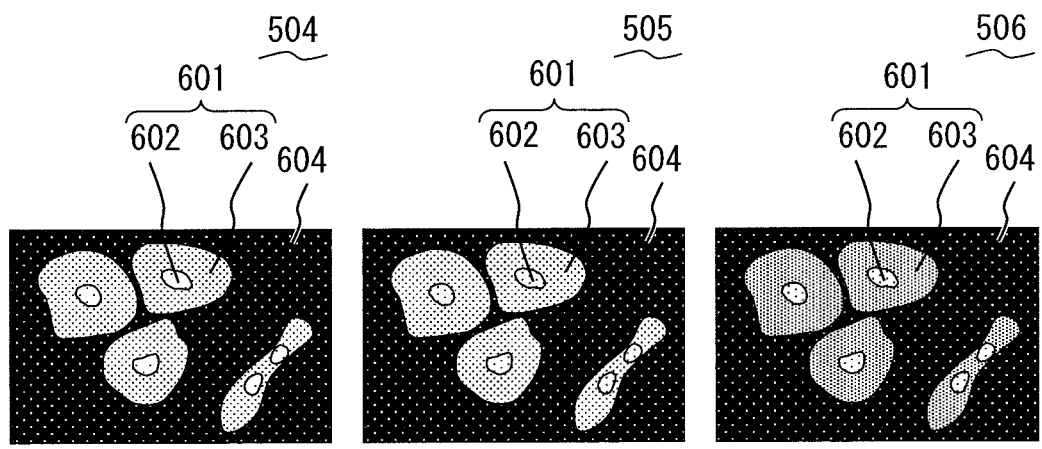
FIG. 6D exemplifies a fluorescent image acquired at a relative position exemplified in FIG. 5A.
FIG. 6E exemplifies a fluorescent image acquired at a relative position exemplified in FIG. 5A.
FIG. 6F exemplifies a fluorescent image acquired at a relative position exemplified in FIG. 5A.
Figures 6G, 6H, 6I:
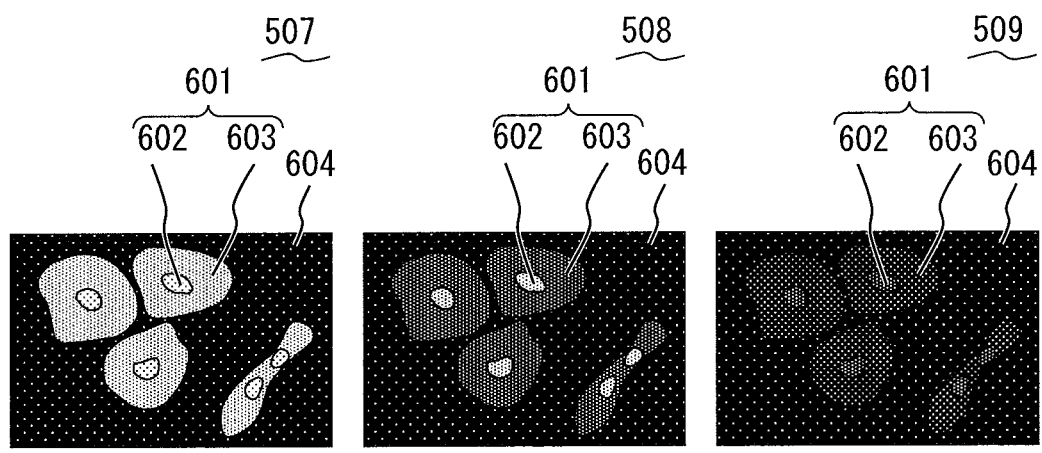
FIG. 6G exemplifies a fluorescent image acquired at a relative position exemplified in FIG. 5A.
FIG. 6H exemplifies a fluorescent image acquired at a relative position exemplified in FIG. 5A.
FIG. 6I exemplifies a fluorescent image acquired at a relative position exemplified in FIG. 5A.
Figure 7:
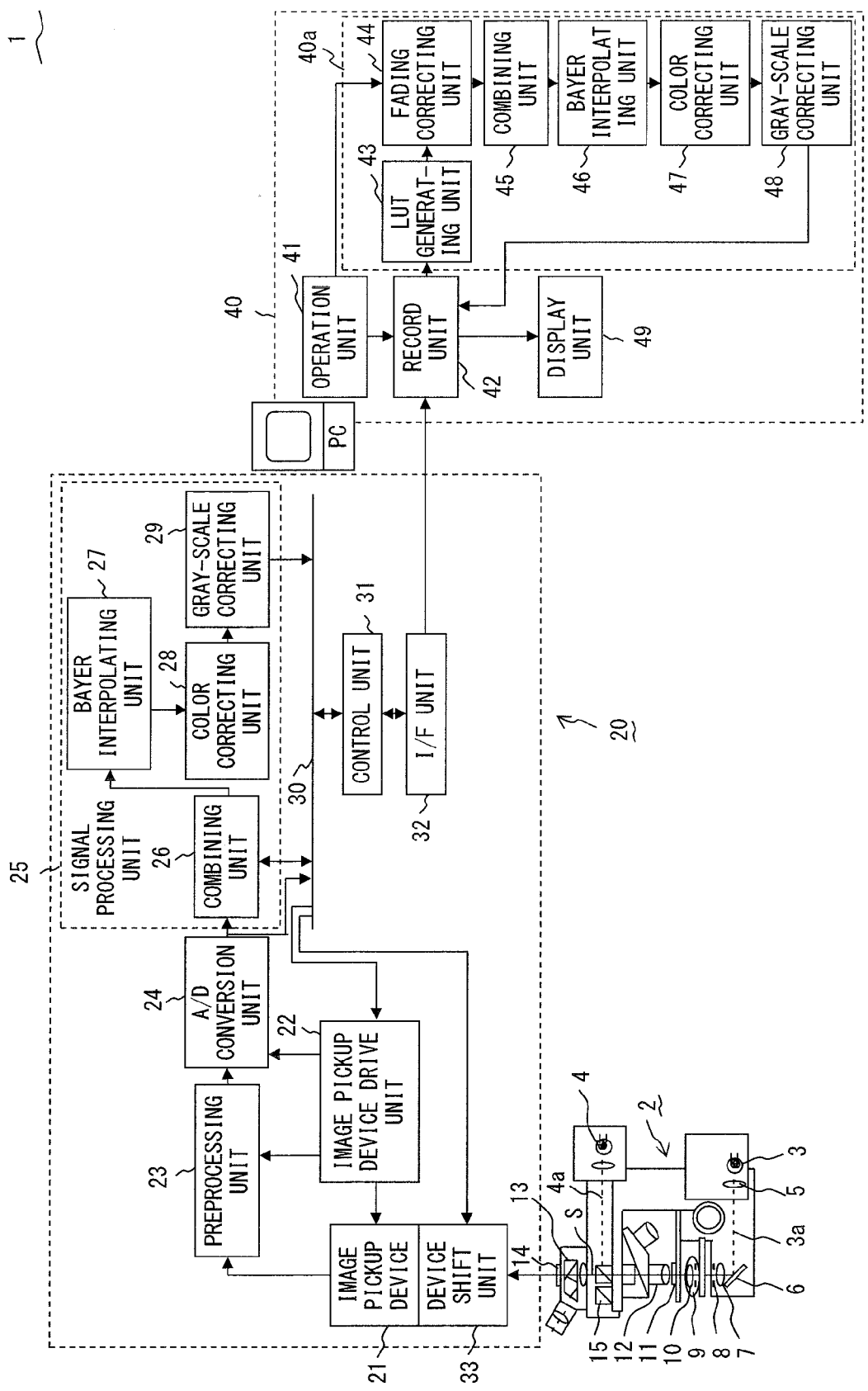
FIG. 7 exemplifies a configuration of the imaging apparatus according to an embodiment 1.

FIG. 7 exemplifies a configuration of the imaging apparatus according to the present embodiment. An imaging apparatus 1 exemplified in FIG. 7 is configured by a microscope 2 for forming an optical image of a sample 11, an imaging apparatus body 20 for generating an image from an optical image formed by the microscope 2, and a PC 40 for displaying the image generated by the imaging apparatus body 20. The imaging apparatus 1 can generate an image of a high resolution using the pixel shifting technique.

The microscope 2 can switch among various microscopy methods for a fluorescent observation etc., and includes a light source 3 for transmitted illumination, a light source 4 for incident-light illumination, a cube unit 15, etc. to be used depending on each microscopy method.

On a transmitted illumination optical path 3a of the microscope 2, a collector lens 5, a mirror 6, a window lens 7, a field stop (FS) 8, a aperture stop (AS) 9, and a condenser lens 10 are arranged in order from the light source 3 toward the sample 11. On the other hand, on an incident-light illumination optical path 4a, an exchangeable cube unit 15 etc. in addition to the collector lens, the AS and the FS although not illustrated in FIG. 7, and an objective 12 are arranged. On the observation path S, the objective 12, the cube unit 15, a tube lens 13, and a port 14 are arranged in order from the range of the sample 11.

Various filters and optical devices such as a polarization device etc. can be further arranged on the illumination optical path and the observation optical path. The objective 12 and the cube unit 15 are arranged so that they can be switched depending on the observation magnification and the microscopy method.

The imaging apparatus body 20 is configured by an image pickup device 21 for optoelectrically converting the light from the sample 11 to an electric signal, an image pickup device drive unit 22 for controlling the drive of the image pickup device 21, a preprocessing unit 23 for converting the electric signal output from the image pickup device 21 into a video signal, an A/D conversion unit 24 for converting the video signal into a digital signal (image data), a signal processing unit 25, a bus 30, a control unit 31, an I/F unit 32 connected to the PC 40, and a device shift unit 33 for changing the position of the image pickup device 21. The signal processing unit 25 includes a combining unit 26, a bayer interpolating unit 27, a color correcting unit 28, and a gray-scale correcting unit 29.

The image pickup device 21 is a solid-state image pickup device such as a CCD etc. having a plurality of pixel units capable of independently detecting the quantity of light, and is an imaging unit for capturing an image of the sample 11. Each pixel unit of the image pickup device 21 is arranged in a bayer array, for example, at the initial pixel positions 701, 702, 703, 704, etc. as illustrated in FIG. 5B. The device shift unit 33 is a pixel shift unit for changing the relative position of the image pickup device 21 relative to the image of the sample 11.

The imaging apparatus body 20 changes the relative position of the image pickup device 21 relative to the image of the sample 11 using the device shift unit 33, thereby acquiring a plurality of images by the image pickup device 21. Then, using the signal processing unit 25, an image of a high resolution can be generated by combining the plurality of acquired images.

The PC 40 is configured by a signal processing unit 40a, an operation unit 41, a record unit 42, and a display unit 49. The signal processing unit 40a includes a LUT generating unit 43, a fading correcting unit 44, a combining unit 45, a bayer interpolating unit 46, a color correcting unit 47, and a gray-scale correcting unit 48, and is configured as software operating on the PC 40. However, a dedicated device can replace the PC 40. In this case, the signal processing unit 40a can be configured as hardware.

Like the signal processing unit 25, the signal processing unit 40a has the function of generating an image of a high resolution by combining a plurality of acquired images, and normally the signal processing unit 25 or the signal processing unit 40a is selectively used. That is, the signal processing unit 25 is a first signal processing unit of the imaging apparatus 1, and the signal processing unit 40a is a second signal processing unit.

As described later, the signal processing unit 40a corrects the gray-scale levels of the plurality of images acquired at different relative positions using the accumulative histogram of the images, and then combines the corrected images. Therefore, the signal processing unit 40a is different from the signal processing unit 25 in that it suppresses the influence of quick fading of the fluorescent coloring agent contained in the sample 11, and maintains high quality of a generated image. Described next in detail is the operation of the imaging apparatus 1 according to the present embodiment.

In the present embodiment, a light source which is a mercury lamp etc. and emits ultraviolet (UV) as exciting light is used as the light source 4, and a fluorescent sample dyed with a fluorescent coloring agent for generating fluorescence having a peak of the wavelength around 450 nm by UV exciting is used as the sample 11. Therefore, most of the images of the sample 11 are blue. The cube unit 15 is a fluorescent cube unit made of a dichroic mirror and a fluorescent filter configured according to the wavelength of the exciting light and fluorescence.

First, the exciting light emitted from the light source 4 for incident-light illumination passed through the condenser lens and enters the cube unit 15 through the FS and the AS not illustrated in FIG. 7. Upon receipt of the exciting light, the cube unit 15 functions as a excitation filter selectively reflecting the light of the exciting wavelength depending on the sample 11. The exciting light reflected by the cube unit 15 is irradiated on the sample 11 through the objective.

In the sample 11 on which the exciting light is irradiated, the fluorescent coloring agent contained in the sample 11 is excited, and fluorescence of a wavelength longer than the exciting light is generated. The fluorescence enters the cube unit 15 through the objective 12 with the exciting light reflected by the sample 11. In this case, the cube unit 15 functions as an absorbing filter for passing the fluorescence and interrupting the exciting light. Therefore, the fluorescence is separated from the exciting light by the cube unit 15, and emitted from the port 14 toward the image pickup device 21 through the tube lens 13.

In the imaging apparatus body 20 connected to the port 14, the image pickup device 21 is arranged in the position where the optical image of the sample 11 is projected by the tube lens 13. The image pickup device 21 is driven for the exposing time based on the drive signal from the image pickup device drive unit 22, optoelectrically converts the fluorescence (image of the sample 11) input during the drive, and outputs an electric signal to the preprocessing unit 23.

The preprocessing unit 23 which has received the electric signal receives a control pulse from the image pickup device drive unit 22, converts the electric signal into a video signal, and outputs the resultant signal to the A/D conversion unit 24. The A/D conversion unit 24 converts the video signal into a digital signal (image data) according to the clock signal from the image pickup device drive unit 22 and outputs the resultant signal. The output image data is output to the PC 40 through the bus 30, the control unit 31, and the I/F unit 32, and displayed as moving pictures on the display unit 49.

Figure 8:
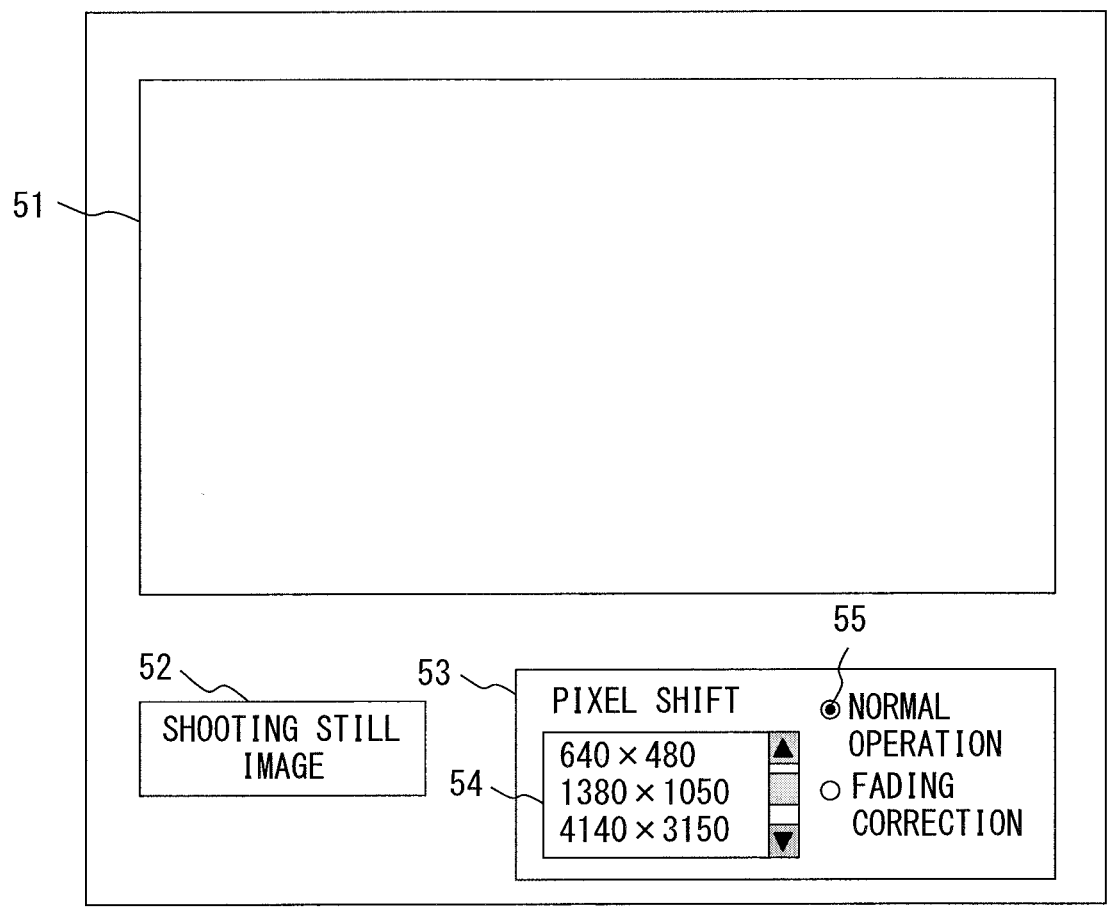
FIG. 8 exemplifies the GUI screen of the program for generating a still image used in the imaging apparatus according to the embodiment 1.

In the imaging apparatus 1, when the program for generating a still image is activated at an instruction of a user input from the operation unit 41, for example, a GUI screen 50 exemplified in FIG. 8 is displayed on the display unit 49.

The GUI screen 50 is configured by a still image area 51 for displaying a still image, a button 52 for starting generating a still image, and a selection panel 53 for inputting a condition of a generated image. The selection panel 53 includes a list box 54 for specifying the size of a still image to be generated, and a radio button 55 for selecting whether or not a fading correction described later is to be made when an image is generated.

The GUI screen of a program is not specifically limited. For example, a GUI screen can be a GUI screen 56 exemplified in FIG. 9. The GUI screen 56 has a selection panel 57 instead of the selection panel 53, and realizes the function of the list box 54 and the radio button 55 by a list box 58 only.

"640×480" or "1380×1050" exemplified in the list box 54 in FIG. 8 exemplifies the size equal to or lower than the number of pixels (resolution) of the image pickup device 21. Therefore, if the button 52 is pressed with "640×480" or "1380×1050" selected, a still image is generated without the pixel shifting technique, and displayed in the still image area 51.

To be more concrete, an instruction of a user is input to the control unit 31 through the operation unit 41 and the I/F unit 32. The control unit 31 records the image data output from the A/D conversion unit 24 to the record unit 42 in the PC 40, and displays the data as a still image on the still image area 51 at the instruction of the user.

On the other hand, "4140×3150" exemplified in the list box 54 indicates the size exceeding the number of pixels (resolution) of the image pickup device 21. When "4140×3150" is selected, the radio button 55 is in an effective state, and one of "normal operation" and "fading correction" can be selected.

When the button 52 is pressed with "4140×3150" and "normal operation" selected, the instruction of the user is input to the control unit 31 through the operation unit 41 and the I/F unit 32. Then, the control unit 31 operates to generate a still image using the pixel shifting technique and display the image on the still image area 51.

To be concrete, the device shift unit 33 changes the position of the image pickup device 21 in order among the none relative positions exemplified in FIG. 5A. Then, the image pickup device drive unit 22 drives the image pickup device 21 at each relative position for a predetermined exposing time, and outputs nine pieces of image data obtained at the corresponding relative positions to the A/D conversion unit 24 through the preprocessing unit 23. Since it is not necessary to make a fading correction on the nine pieces of output image data of different relative positions, the data is output to the signal processing unit 25.

In the signal processing unit 25, the nine pieces of image data are combined into image data (bayer RAW data) having the bayer pattern 700 as exemplified in FIG. 5B. The combined image data is converted into image data in the RGB format by the bayer interpolating unit 27, and the color tone is corrected using a color conversion matrix by the color correcting unit 28. Then, after the gray-scale correcting unit 29 corrects the gray scale such as a gamma correction etc. corresponding to an output device, the data is output from the signal processing unit 25. The image data output from the signal processing unit 25 is stored in the record unit 42, and displayed as a still image on the still image area 51.

On the other hand, when the button 52 is pressed with "fading correction" selected instead of "normal operation", the instruction of the user is likewise input to the control unit 31 through the operation unit 41 and the I/F unit 32. Then, the control unit 31 operates to generate a still image using the fading correcting process described later in addition to the pixel shifting technique, and display the image in the still image area 51.

Figure 10:
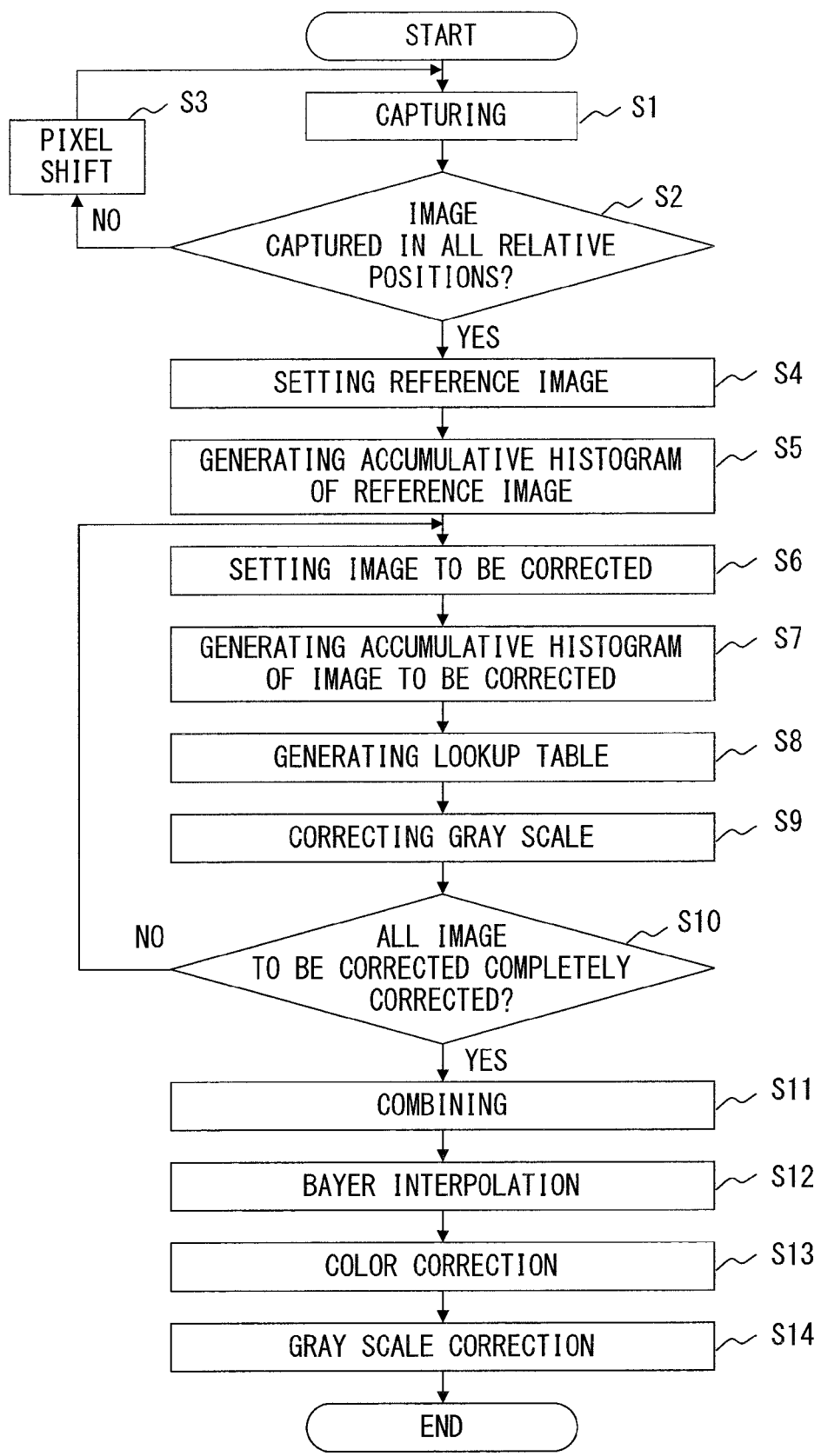
FIG. 10 is a flowchart of the image generating process including the fading correcting process used in the imaging apparatus according to the embodiment 1.

FIG. 10 is a flowchart of the image generating process using the fading correcting process with the pixel shifting technique. The image generating process using the fading correcting process is described below with reference to FIG. 10.

First, when the process is started, the image data of the sample 11 is acquired in the nine relative positions exemplified in FIG. 5A.

That is, the control unit 31 controls the image pickup device drive unit 22 and drives the image pickup device 21 at the first relative position Pos 1 for a predetermined exposing time. Then, the output electric signal is converted into a video signal by the preprocessing unit 23, and further converted into image data by the A/D conversion unit 24 (step S1). Since it is necessary to perform fading correction, the image data is output to the PC 40. To be concrete, the data is recorded on the record unit 42 through the bus 30, the control unit 31, and the I/F unit 32.

The control unit 31 determines whether or not the image has been completely captured in all relative positions (step S2). If not, the control unit 31 allows the device shift unit 33 to change the position of the image pickup device 21 to the next relative position, that is, the second relative position Pos 2 (step S3), thereby capturing the sample 11 (step S1). The process is repeated in all relative positions up to the ninth relative position Pos 9.

Next, the fading correcting process is performed on the image data recorded on the record unit 42.

The fading correcting process according to the present embodiment generates a histogram about the gray scale of plural pieces of image data used in the pixel shifting technique, and corrects the gray scale of each piece of image data based on the histogram.

In the fading correcting process, the gray scale is corrected so that the form of the histogram of each piece of image data can match each other based on that the forms of the histograms of plural pieces of acquired image data are similar to one another when fading does not occur. That is, the influence of fading is removed by detecting the influence of the fading as a change of a histogram, and correcting the change of the histogram.

Since plural pieces of image data used in the pixel shifting technique are acquired in different relative positions to the optical image of the sample 11, the histograms of the image data do not match strictly although there occurs no fading. However, by considering (a) the amount of the change in relative position is about ⅔ pitch, that is, very small for the entire image, and (b) the histograms indicate the tendency of the gray scale of the entire image, etc., the differences among the histograms are very small and ignorable if no fading occurs.

The fading correcting process is performed by the signal processing unit 40a. First, the image data acquired in the first relative position Pos 1 is read from nine pieces of image data, and set as a reference image (step S4). The first relative position Pos 1 is a reference position, and other relative positions are shifted positions changed from the reference position. The fading correcting process corrects each piece of image data into the substantially the same fading level as the reference image as described later. Therefore, it is preferable that the reference image refers to the image data indicating the lowest fading level. Therefore, in the present embodiment, since the image data acquired in the first relative position Pos 1 is first acquired, it is considered that the data indicates the fluorescent coloring agent at the lowest fading level, and the image data acquired in the first relative position Pos 1 is set as a reference image. However, the reference image is not limited to the image acquired in the first relative position Pos 1. So far as a satisfactory fading correction is made, any image data can be selected.

Next, the accumulative histogram of the reference image is generated (step S5). The accumulative histogram relates to gray scale, and is expressed using the horizontal axis indicating the gray scale (density, quantity of light) and the vertical axis indicating the accumulated number of occurrences. it is generated for each of the components R, G, and B of the reference image.

Furthermore, from eight pieces of image data whose gray scale is corrected (hereinafter referred to as an image to be corrected) other than the reference image, one image to be corrected is selected (step S6), and the accumulative histogram about the gray scale (density) is generated for each component of R, G, and B (step S7).

FIG. 11A is a histogram of the reference image. FIG. 11B is a histogram of an image to be corrected. They represent the accumulative histograms generated respectively in steps S5 and S7.

As illustrated in FIGS. 11A and 11B, each of the histograms R1 and R2 of red (R) and the histograms G1 and G2 of green (G) has only one peak. On the other hand, each of the histograms B1 and B2 of blue (B) has two peaks because the fluorescence generated from the sample 11 is configured mostly by blue. That is, since the histograms R1, R2, G1, and G2 are configured mostly by background light, they indicate only the peak of the background light. On the other hand, since the histograms B1 and B2 are configured by background light and fluorescence, they have the peak of the background light and the peak of the fluorescence.

In addition, FIG. 12A is the histogram B1 of FIG. 11A, and FIG. 12B is the histogram B2 of FIG. 11B. FIG. 12C is the accumulative histogram BC1 of the histogram B1 exemplified in FIG. 12A, and FIG. 12D is the accumulative histogram BC2 of the histogram B2 exemplified in FIG. 12B.

When FIG. 12A is compared with FIG. 12B, the peak of the background light positioned in a low gray scale area hardly changes, but the peak of the fluorescence of the histogram B2 moves to the low gray scale range as compared with the peak of the fluorescence of the histogram B1 after the progress of the fading.

Then, to correct the change of the histogram generated by the influence of the fading, a lookup table for conversion from the accumulative histogram of the image to be corrected into the accumulative histogram of the reference image is generated based on the accumulative histogram of the reference image and the accumulative histogram of the image to be corrected (step S8). That is, a lookup table is generated so that the accumulative histogram of the image to be corrected whose gray scale has been corrected using the lookup table can match the accumulative histogram of the reference image. The lookup table is generated for each of the R, G, and B.

Practically, when the gray scale (density) of the reference image is $I_{OUT}$, the accumulation frequency of the reference image is $S_{OUT}(I_{OUT})$, the gray scale (density) of the image to be corrected is $I_{IN}$, the accumulation frequency of the image to be corrected is $S_{IN}(I_{IN})$, and the input/output relationship of the lookup table is LUT, the lookup table satisfies the relational expression (2) with respect to the gray scale $I_{OUT}$ of the reference image and the gray scale $I_{IN}$ of the image to be corrected which satisfy the following relational expression (1).

$$S_{OUT}(I_{OUT}) = S_{IN}(I_{IN}) \tag{1}$$

$$I_{OUT} = LUT[I_{IN}] \tag{2}$$

Thus, for example, relating to blue, a lookup table having the input/output relationship represented by the gray-scale correction curve L1 exemplified in FIG. 12E is generated from the accumulative histogram BC1 of the reference image and the accumulative histogram BC2 of the image to be corrected.

The histogram of the color containing fluorescence is linear and indicates the input/output ratio of about 1 in the low gray scale area like the gray-scale correction curve L1, and is a curve whose inclination increases from the medium gray scale area to the high gray scale area because the background light is hardly subject to the influence of the fading and darker than the fluorescence, and is positioned in a low gray scale range while the fluorescence is positioned in a relatively high gray scale range. The degradation of the gray scale by the fading can be corrected by enhancing the input/output ratio up to or exceeding 1 in the high gray scale range in which the fluorescence is positioned.

The above-mentioned accumulative histogram generating process and the lookup table generating process are performed by the LUT generating unit 43.

In the fading correcting unit 44, the gray scale of an image to be corrected is corrected for each of R, G, and B using the lookup table generated by the LUT generating unit 43 for each of R, G, and B (step S9). Thus, the image to be corrected is corrected to substantially the same the fading level as the reference image.

Afterwards, it is determined whether or not the gray scale levels of all of the eight images to be corrected other than the reference image have been completely corrected (step S10). If not, another image to be corrected is selected (step S6), and a similar process is repeated. When the gray scale levels of all images to be corrected are completely corrected, the reference image and the images to be corrected whose gray scale levels have been corrected are output to the combining unit 45.

In the combining unit 45, the nine pieces of input image data (reference image and eight gray scale corrected images to be corrected) are combined into image data (bayer RAW data)) having the bayer pattern 700 exemplified in FIG. 5B (step S11).

The combined image data is converted into the image data in the RGB form by the bayer interpolating unit 46 (step S12), the color is corrected by the color correcting unit 47 using the color conversion matrix (step S13), and the gray-scale correcting unit 48 performs a gray scale correction such as a gamma correction according to the output device (step S14). After all processes have been completed, the image data is recorded on the record unit 42, and displayed as a still image in the still image area 51 through the display unit 49. Thus, since the checkered pattern occurring when a fluorescent sample is converted into an image in the pixel shifting technique can be suppressed in the image displayed as described above, preferred image quality and a high resolution can be realized.

As described above, according to the imaging apparatus and the image generating method of the present embodiment, the difference in the fading state occurring among a plurality of images in the different relative positions in the pixel shifting technique, that is, the difference in brightness of an image, can be corrected using a histogram. Since the checkered pattern occurring by combining image having different brightness can be suppressed, a fluorescent image of a high resolution and high quality can be generated using the pixel shifting technique.

In the fading correcting process above, a lookup table is generated using an accumulative histogram, but the present invention is not limited to the application. A histogram can replace the accumulative histogram in generating a lookup table.

Although an accumulative histogram and a lookup table are generated for each of R, G, and B in the fading correcting process above, the present invention is not limited to this application. That is, one accumulative histogram and one lookup table can be generated for each image without generating them for each of R, G, and B.

In addition, in the fading correcting process above, the gray scale correction is performed by the fading correcting unit 44 regardless of the input/output relationship of the lookup table, but it is not always necessary to perform a gray scale correction. When there is little change in gray scale distribution between the reference image and the images to be corrected, the gray scale correction can be omitted. Thus, the image generating process can be performed in a high speed.

To be concrete, for example, if the threshold optimized for the imaging apparatus 1 is AI, the relational expression (2) above is satisfied, and the relational expression (3) below is further satisfied in the lookup table with respect to the gray scale $I_{OUT}$ of the reference image and the gray scale $I_{IN}$ of the image to be corrected which the relation expression (1) are satisfied in, then the gray scale correction can be omitted by the fading correcting unit 44.

$$\mathrm{LUT}[I_{IN}] - I_{IN} \leq |\Delta I| \tag{3}$$

In the fading correcting process above, the LUT generating unit 43 generates a lookup table satisfying the relational expressions (1) and (2) above, but is not limited to this application. Furthermore, the input/output relationship of the lookup table can be adjusted by performing a process for correcting the gray-scale correction curve such as a movement leveling process etc.

When an accumulative histogram is used, more errors are accumulated at a hither gray scale level. Therefore, the calculated value of a lookup table indicates a larger calculation error at a higher gray scale level, thereby degrading the correction accuracy. However, since the calculation errors can be reduced by performing the movement leveling process etc., a more preferable gray scale correction can be performed.

Instead of the correction to a gray-scale correction curve by the leveling process, a gray-scale correction curve can be estimated from a plurality of values included in the lookup table. This process can similarly attain the effect of the leveling process.

<Embodiment 2>

Figure 13B:
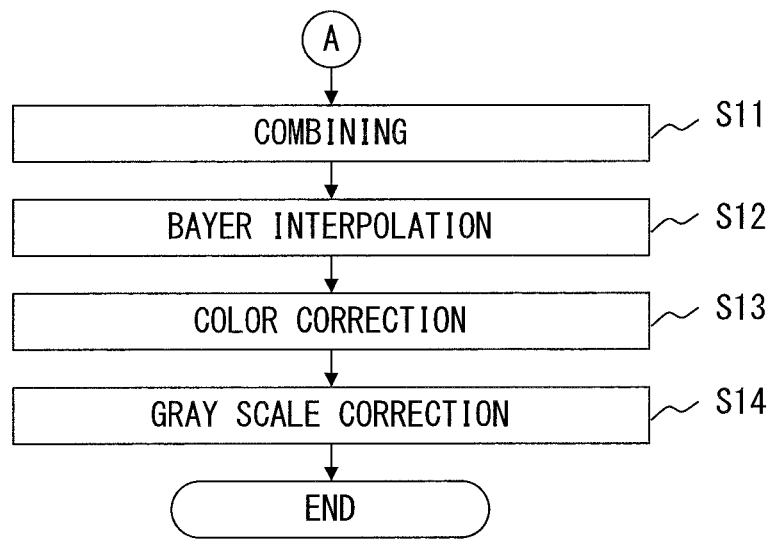
FIG. 13B is a flowchart of the image generating process including the fading correcting process used in the imaging apparatus according to the embodiment 2.

FIGS. 13A and 13B is a flowchart of the image generating process according to the present embodiment using the fading correcting process with the pixel shifting technique. The image generating process according to the present embodiment is different from the image generating process according to the embodiment 1 exemplified in FIG. 10 in that the process of identifying a subject is added and the fading correcting process is performed on each subject.

The image generating process according to the present embodiment is described below with reference to FIGS. 13A and 13B by centering the difference from the image generating process according to the embodiment 1. The configuration of the imaging apparatus according to the present embodiment is similar to the configuration of the imaging apparatus according to the embodiment 1.

In the image generating process according to the present embodiment, image data is first acquired in each relative position, and then the subject identifying process is performed on each piece of acquired image data (step S15). The subject identifying process is to identify the background area and each subject (for example, a cell area) in the image data, and is performed on, for example, input image data by combining a binary process and a feature amount calculating process. In the description below, the background area is also regarded as a subject. In the subject identifying process can be performed by, for example, the LUT generating unit 43.

When images are acquired in all relative positions, one subject is selected from among the identified subjects (step S16). Then, in the method similar to the image generating process according to the embodiment 1, the gray scale of each image to be corrected is corrected (steps S4 through S10).

However, the image generating process according to the present embodiment is different from the image generating process according to the embodiment 1 in that the process is performed only on the subject portion which has been selected for the gray scale correction to the image to be corrected. Therefore, in the accumulative histogram generating process for the reference image (step S5), an accumulative histogram of the selected subject portion of the reference image is generated while in the accumulative histogram generating process for the image to be corrected (step S7) an accumulative histogram of the selected subject portion of the image to be corrected is generated. Based on the accumulative histograms, a lookup table is generated (step S8), and the gray scale of the selected subject portion of the image to be corrected is corrected (step S9).

When the gray scale correction to all selected subject portions of all images to be corrected is completed, it is determined whether or not all subject portions have been completely corrected (step S17). If not, other subjects are selected (step S16), and similar processes are repeated.

If the gray scale correction is completed on all subject portions for all images to be corrected, the nine pieces of image data in which the gray scale of each subject has been corrected are combined by the method similar to the image generating process according to the embodiment 1 (step S11) and processed (steps S12, S13, and S14).

When all processes are completed, the image data is recorded on the record unit 42, and displayed on the display unit 49.

Figure 14:
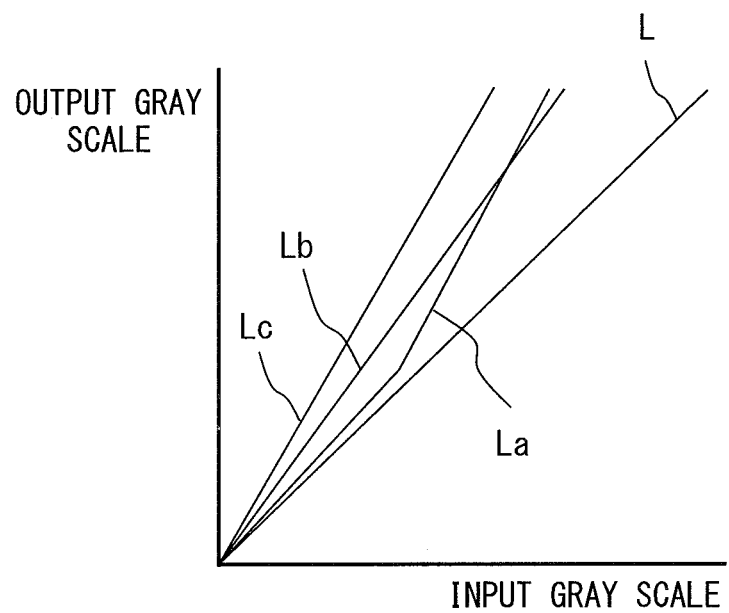
FIG. 14 exemplifies a gray-scale correction curve expressed by the lookup table for each subject generated by the imaging apparatus according to the embodiment 2.

FIG. 14 exemplifies the gray-scale correction curve represented by the lookup table for each subject. Gray-scale correction curve La, Lb, and Lc relate to different subjects of the same image to be corrected.

Thus, according to the present embodiment, an accumulative histogram and a lookup table are generated for each subject. Therefore, the optimum lookup table can be generated for each subject although each subject has a different characteristic (that is, the shape and the change of the shape are different) due to the difference in type of cell or portion. The specific area on the screen (area of interest) can be specified using the GUI, and the fading correction can be performed on only the inside of the area. The accuracy of the correction can be enhanced by specifying that the fading speed can match only inside the area attracting attention.

Therefore, for the sample 11 containing subjects having different characteristics, the difference in fading level occurring among a plurality of images in different relative positions and among the subjects in the images, that is, the difference in image brightness, can be corrected. As a result, the checkered pattern occurring by combining images of different brightness levels can be suppressed.

As described above, according to the imaging apparatus and the image generating method according to the present embodiment, as with the embodiment 1, a fluorescent image of a high resolution and high quality can be generated using the pixel shifting technique. In addition, according to the present embodiment, since the fading can be successfully corrected although the characteristics of the subjects are different, a fluorescent image of a high resolution and higher quality can be generated.

<Embodiment 3>

Figure 15B:
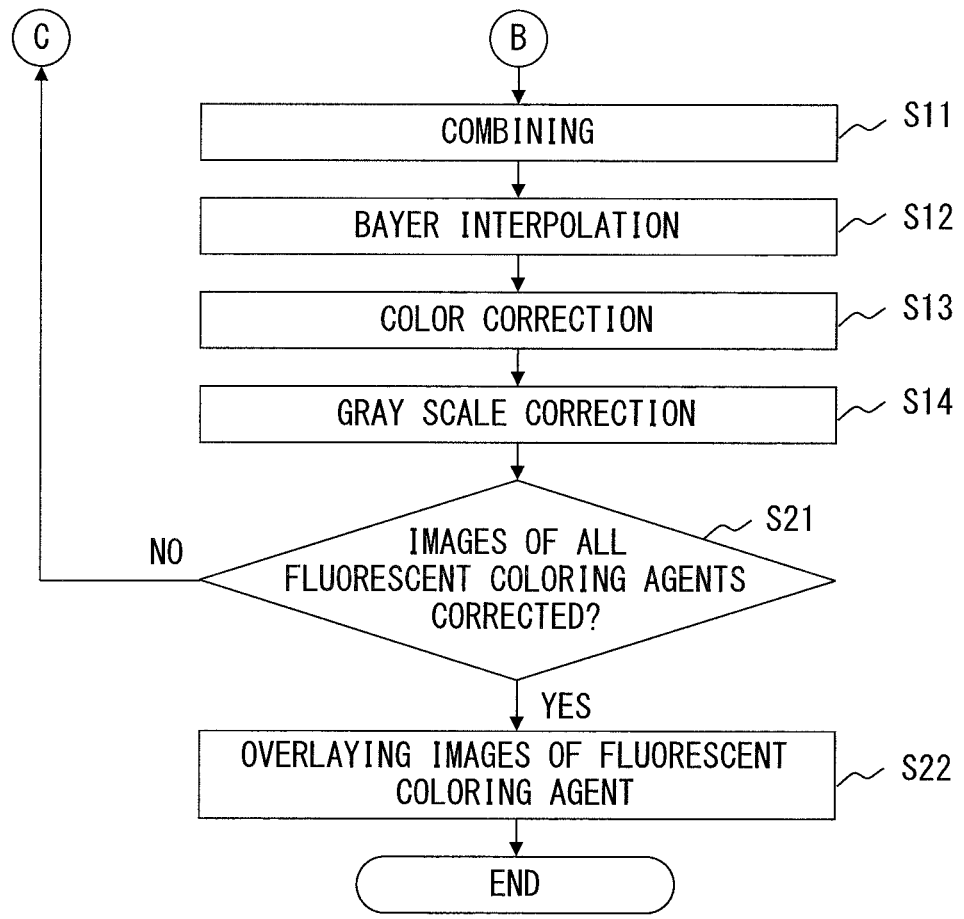
FIG. 15B is a flowchart of the image generating process including the fading correcting process used in the imaging apparatus according to the embodiment 3.

FIGS. 15A and 15B is a flowchart of the image generating process according to the present embodiment using the fading correcting process with the pixel shifting technique. The image generating process according to the present embodiment is different from the image generating process according to the embodiment 1 exemplified in FIG. 10 in that an unmixing process for generating image data for each fluorescent coloring agent from one piece of image data is added and the fading correcting process on the image data is performed for each fluorescent coloring agent.

The image generating process according to the present embodiment is described below with reference to FIGS. 15A and 15B by centering the difference from the image generating process according to the embodiment 1. The configuration of the imaging apparatus according to the present embodiment is similar to the configuration of the imaging apparatus according to the embodiment 1.

In the image generating process according to the present embodiment, fluorescent wavelength data emitted from a fluorescent coloring agent included in the sample 11 is acquired from the record unit 42 as a fluorescence information storage unit (step S18). The record unit 42 stores in advance the wavelength data of the fluorescence emitted from the fluorescent coloring agent.

Then, image data is acquired in each relative position (step S1). Then, the unmixing process is performed using the acquired image data and wavelength data (step S19).

The unmixing process is to generate image data from the fluorescence emitted from each fluorescent coloring agent based on that the wavelength characteristic of the fluorescence emitted from each fluorescent coloring agent is different from each other. Therefore, plural pieces of image data generated for each fluorescent coloring agent are obtained. The unmixing process can also be performed by, for example, the LUT generating unit 43.

After the acquisition of images at all relative positions and the unmixing process have been completed, one fluorescent coloring agent is selected from the fluorescent coloring agents contained in the sample 11 (step S20). Thus, the image data at nine relative positions relating to the selected fluorescent coloring agents are selected.

The gray scale levels of the eight images to be corrected other than the reference image in the nine pieces of image data relating to the selected fluorescent coloring agents are corrected in the method similar to the image generating process according to the embodiment 1 (steps S4 through S10). That is, in the accumulative histogram generating process on the reference image (step S5), the accumulative histogram of the reference image of the selected fluorescent coloring agents is generated, and in the accumulative histogram generating process on the image to be corrected (step S7), the accumulative histogram of the image to be corrected of the selected fluorescent coloring agent is generated. Based on the accumulative histograms, a lookup table is generated (step S8), and the gray scale of the image to be corrected of the selected fluorescent coloring agent is corrected (step S9).

When the gray scale correction to all images to be corrected of the selected fluorescent coloring agents is completed, the nine pieces of image data of the selected fluorescent coloring agents whose gray scale levels have been corrected are combined by the method similar to the image generating process according to the embodiment 1 (step S11), and are processed (steps S12, S13, and S14).

Next, it is determined whether or not images to be corrected of all fluorescent coloring agents have completely been corrected (step S21). If not, other fluorescent coloring agents are selected (step S20), and the image data at each of the nine relative positions relating to the newly selected fluorescent coloring agents is selected. Afterwards, similar processes are repeated.

After the correction to the images to be corrected of all fluorescent coloring agents is completed, the image data generated for each fluorescent coloring agent is stored on the record unit 42, and displayed on the display unit 49 with the image data of each fluorescent coloring agent overlapping each other (step S22).

Thus, according to the present embodiment, image data is generated for each fluorescent coloring agent, and an accumulative histogram and a lookup table are generated for each fluorescent coloring agent. Therefore, the difference in fading state occurring between a plurality of images at different relative positions and between fluorescent coloring agents, that is, the difference in image brightness can be corrected even for the sample 11 containing a plurality of fluorescent coloring agents having different fading speeds. As a result, the checkered pattern occurring by combining images of different brightness can be suppressed.

As described above, in the imaging apparatus and the image generating method according to the present embodiment, as with the embodiment 1, a fluorescent image of a high resolution and high quality can be generated using the pixel shifting technique. In addition, according to the present embodiment, a fluorescent image of a high resolution and better quality can be generated because the fading can be successfully corrected even when a plurality of fluorescent coloring agents having different fading speeds are contained.
<Embodiment 4>

Figure 16:
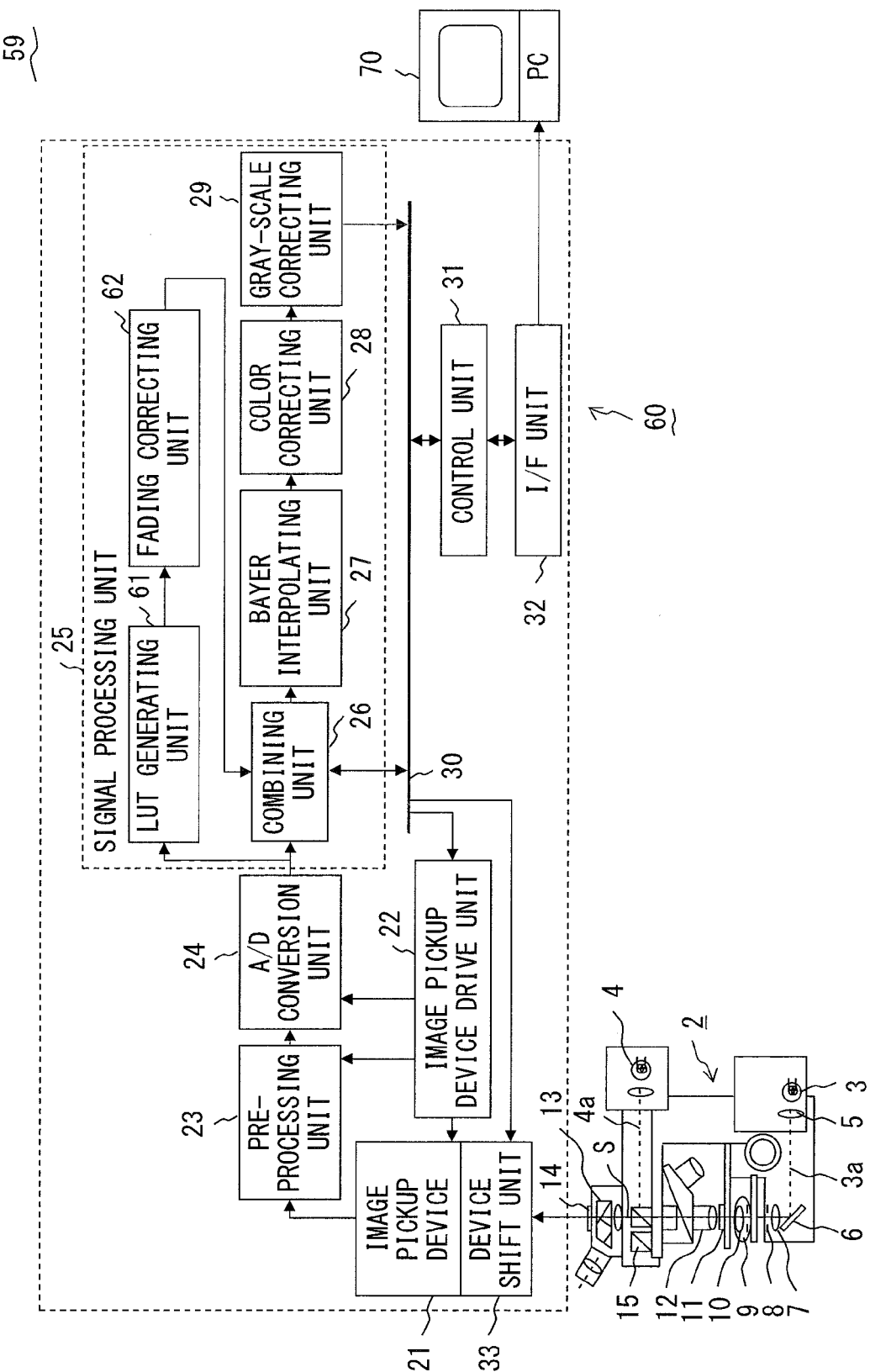
FIG. 16 exemplifies a configuration of the imaging apparatus according to the embodiment 4.

FIG. 16 exemplifies the configuration of the imaging apparatus according to the present embodiment. An imaging apparatus 59 according to the present embodiment is similar to the imaging apparatus 1 according to the embodiment 1 in that it is configured by a microscope 2, an imaging apparatus body, and a PC. However, the imaging apparatus 59 is different in that all processes for generating an image is performed by an imaging apparatus body 60 regardless of the presence/absence of a fading correction to be made. Therefore, a LUT generating unit 61 and a fading correcting unit 62 are added for performing the fading correcting process to the imaging apparatus body 60 of the imaging apparatus 59. On the other hand, a PC 70 includes, although not illustrated in FIG. 16, the operation unit 41, the record unit 42, and the display unit 49, but does not include the signal processing unit 40a.

With the imaging apparatus 59, as with the imaging apparatus 1, the image generating process exemplified in FIG. 10 can be performed. The image generating process including the subject identifying process exemplified in FIG. 13A and the unmixing process exemplified in FIG. 15A can also be performed.

As described above, according to the imaging apparatus and the image generating method of the present embodiment, as with the embodiment 1, a fluorescent image of a high resolution and high quality can be generated using the pixel shifting technique. In addition, as with the embodiment 2 or 3 by performing the subject identifying process and the unmixing process, a fluorescent image of a high resolution and higher quality can be generated.

In the embodiments 1 through 4, the imaging apparatus is configured by a microscope, a imaging apparatus body, and a PC, but the present invention is not limited to this configuration. For example, the imaging apparatus body and the PC can be configured as a digital camera for a microscope for realizing a similar function. In addition, the microscope, the imaging apparatus body, and the PC, that is, the entire imaging apparatus can be configured as a digital camera for realizing a similar function.

What is claimed is:
1. An imaging apparatus, comprising:
an imaging unit configured to capture a plurality of images of a fluorescent sample;
a pixel shift unit configured to change a relative position of the imaging unit for each of the plurality of images;
a processor; and
a memory storing computer readable instructions that, when executed by the processor, implement:
an image correction unit correcting, by setting as a reference image one of the plurality of images acquired by the imaging unit at one of the different relative positions, a gray-scale level of at least one correction target image selected from the plurality of images other than the reference image so that each histogram of each respective correction target image other than the reference image matches a histogram of the reference image; and
an image combination unit combining the reference image and each correction target image corrected by the image correction unit so as to generate image data with a higher resolution than each of the plurality of images.

2. The apparatus according to claim 1, wherein the image correction unit corrects image data, of each correction target image, corresponding to a part of the fluorescent sample whose fluorescent coloring agent is degraded by fading.

3. The apparatus according to claim 1, wherein the image correction unit comprises:
a histogram generation unit generating a histogram of image data, of each of the plurality of images, for each relative position;
a lookup table generation unit generating a lookup table by comparing the histograms; and a gray-scale correcting unit correcting a gray scale level of each correction target image using the lookup table.

4. The apparatus according to claim 1, wherein the computer readable instructions, when executed by the processor, further implement:
a subject identifying unit identifying each subject contained in the fluorescent sample from image data of each of the plurality of images; wherein
the image correction unit corrects a gray scale level of a portion corresponding to the subject in the image data using a histogram for each subject of the image data.

5. The apparatus according to claim 1, wherein the computer readable instructions, when executed by the processor, further implement:
an unmixing unit generating, from image data of each of the plurality of images, image data for each fluorescent coloring agent contained in the fluorescent sample; wherein
the image correction unit corrects the gray scale level of each correction target image using the histogram of the image data generated for each fluorescent coloring agent.

6. The apparatus according to claim 5, wherein the computer readable instructions, when executed by the processor, further implement:
a fluorescence information storage unit storing wavelength data of fluorescence emitted from a fluorescent coloring agent; wherein
the unmixing unit acquires wavelength data of the fluorescence emitted from the fluorescent coloring agent contained in the fluorescent sample from the fluorescence information storage unit, and generates image data for each fluorescent coloring agent contained in the fluorescent sample using the wavelength data.

7. The apparatus according to claim 1, further comprising:
a microscope for observing the fluorescent sample; wherein
the imaging unit captures plurality of images of the fluorescent sample which has passed the microscope.

8. The apparatus according to claim 7, wherein the imaging apparatus is a digital camera for a microscope.

9. An image generating method, comprising:
changing a relative position of an imaging unit for a plurality of images of a fluorescent sample and capturing each of the plurality of images of the fluorescent sample at a different relative position;
setting, as a reference image, one of the plurality of images acquired at one of the different relative positions and correcting a gray-scale level of of at least one correction target image selected from the plurality of images other than the reference image so that each histogram of each respective correction target image other than the reference image matches a histogram of the reference image; and
combining the reference image and each correction target image whose gray-scale levels have been corrected, so as to generate image data with a higher resolution than each of the plurality of images.

10. The imaging apparatus according to claim 1, wherein the image correction unit corrects gray-scale levels data so as to match a histogram of the reference image, which is captured at a reference position, with a histogram of each correction target image captured at a position other than the reference position.

11. The imaging apparatus according to claim 1, wherein the reference image is a result of first acquiring an image of the fluorescence sample by the imaging unit, and each correction target image is acquired after acquiring the reference image.

12. The method according to claim 9, wherein correcting a gray-scale level of each of the correction target image comprises:
generating a lookup table by comparing the histogram of the reference image data and the histogram of the respective correction target image data; and
correcting a gray scale of image data of the respective correction target image using the lookup table.

13. The method according to claim 12, wherein:
the plurality of different relative positions includes one reference position and shifted positions other than the reference position;
the lookup table is generated for each shifted position by comparing the histogram of the image at the reference position with the histogram of the image at the shifted position.

14. The method according to claim 13, wherein correcting a gray-scale level of each correction target image refers to correcting the gray scale of the respective correction target image at the shifted position, and matching the histogram of the respective correction target image at the shifted position whose gray scale has been corrected with the histogram of the image the reference position.

15. The method according to claim 9, wherein:
correcting a gray-scale level refers to matching a histogram of the reference image, which is captured at a reference position, with a histogram of each correction target image captured at a position other than the reference position.

* * * * *